No. 706,325. Patented Aug. 5, 1902.
H. W. LANGHAM.
NUT LOCK.
(Application filed May 26, 1902.)
(No Model.)
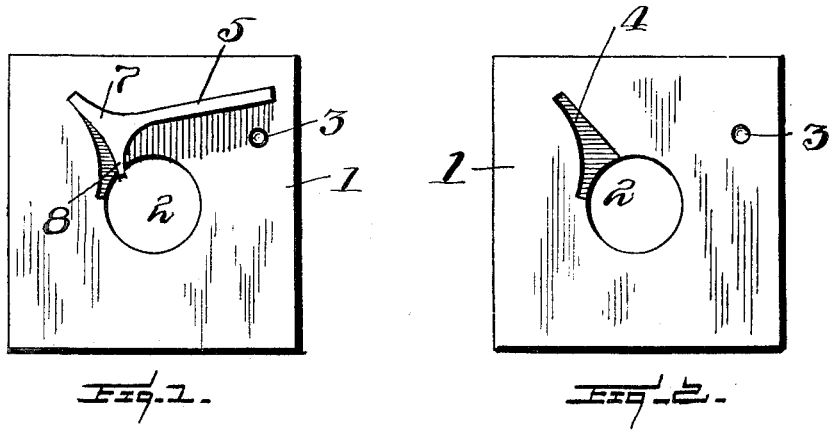
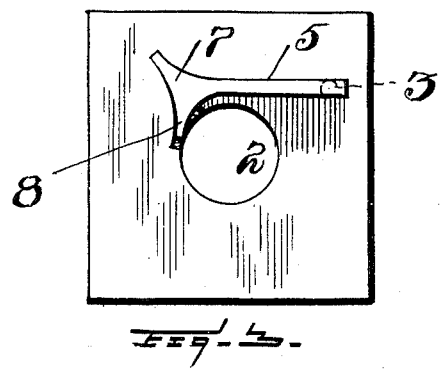
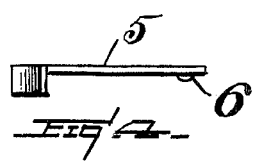
Witnesses:
Inventor:
H. W. Langham,
By his Attorneys.

UNITED STATES PATENT OFFICE.

HERBERT W. LANGHAM, OF BARTON, MARYLAND.

NUT-LOCK.

SPECIFICATION forming part of Letters Patent No. 706,325, dated August 5, 1902.

Application filed May 26, 1902. Serial No. 108,990. (No model.)

*To all whom it may concern:*

Be it known that I, HERBERT W. LANGHAM, a citizen of the United States of America, residing at Barton, in the county of Allegany and State of Maryland, have invented certain new and useful Improvements in Nut-Locks, of which the following is a specification, reference being had therein to the accompanying drawings.

This invention relates to certain new and useful improvements in nut-locks, and relates more particularly to that class of nut-locks that carry a locking device upon the nut.

My invention aims to provide a nut-lock that will be extremely simple in construction, strong, durable, comparatively inexpensive to manufacture, and highly efficient in its use.

My invention further contemplates to provide a nut-lock that may be easily locked and readily removed when desired; furthermore, one that may be used a number of times without destroying the lock, nut, or bolt.

With the above and other objects in view the invention consists in the novel construction, combination, and arrangement of parts to be hereinafter more fully described.

In describing the invention in detail reference is had to the accompanying drawings, forming a part of this specification, and wherein like numerals of reference indicate like parts throughout the several views, in which—

Figure 1 is a front elevation of a nut provided with my improved lock. Fig. 2 is a similar view with the locking device removed therefrom. Fig. 3 is a similar view showing the locking device in an inoperative position. Fig. 4 is a detail view of the locking-lever.

In the drawings the reference-numeral 1 represents a nut having the usual screw-threaded opening 2, said nut being also formed with an aperture 3.

The reference-numeral 4 represents a wedge-shaped recess formed in the base of the nut to receive the locking-lever, said locking-lever being designated by the reference-numeral 5 and carries on its under face a projection 6, which is adapted to fit in the aperture 3. The enlarged head 7 of the locking-lever is formed integral therewith and carries an inwardly-projecting flange 8, which when operated by the lever bites upon the thread of the bolt and forms a locking engagement therewith when placed in position as shown in Fig. 1 of the drawings. The head 7 of the locking-lever is formed in such a manner as to fit into the recess 4; but the latter is formed in a manner as to permit the movement of the locking-lever and head.

It will be noted that the head of the locking-lever, as well as the lever itself, is made of spring-steel, thereby permitting the head of the lever to move within the recess, the spring when in its normal position, as shown in Fig. 1 of the drawings, forming a constant contact with the thread of the bolt and preventing the same from turning.

The many advantages obtained by the use of my improved device will be readily apparent from the foregoing description, taken in connection with the accompanying drawings.

It will be noted that various changes may be made in the details of construction without departing from the general spirit of my invention.

Having fully described my invention, what I claim as new, and desire to secure by Letters Patent, is—

In a nut-lock the combination of a nut provided in its base with an approximately wedge-shaped recess the inner end of which is in communication with the nut-opening, an and aperture arranged adjacent one of the edges of the said nut, and an approximately T-shaped spring locking-lever provided on its enlarged end with an inwardly-projecting integral flange, arranged in the said recess, and provided adjacent its outer end with a projection to engage the said aperture, substantially as described.

In testimony whereof I affix my signature in the presence of two witnesses.

HERBERT W. LANGHAM.

Witnesses:
ANNA B. MCCONNELL,
WILLIE MCCONNELL.